US009796568B1

(12) United States Patent
Gonzales et al.

(10) Patent No.: US 9,796,568 B1
(45) Date of Patent: Oct. 24, 2017

(54) DEVICES AND SYSTEMS FOR VEHICLE RESTORATION AND BODY REPAIR

(71) Applicants: Adalberto B. Gonzales, Anaheim, CA (US); Steven A. Aaronson, Mission Viejo, CA (US)

(72) Inventors: Adalberto B. Gonzales, Anaheim, CA (US); Steven A. Aaronson, Mission Viejo, CA (US)

( * ) Notice: Subject to any disclaimer, the term of this patent is extended or adjusted under 35 U.S.C. 154(b) by 0 days.

(21) Appl. No.: 15/607,363

(22) Filed: May 26, 2017

Related U.S. Application Data

(60) Provisional application No. 62/505,084, filed on May 11, 2017.

(51) Int. Cl.
*B66F 7/00* (2006.01)
*B66F 5/04* (2006.01)
*F16M 11/32* (2006.01)
*F16M 11/42* (2006.01)
*B62B 3/02* (2006.01)
*B66F 7/20* (2006.01)

(52) U.S. Cl.
CPC .................. *B66F 5/04* (2013.01); *B62B 3/02* (2013.01); *B66F 7/20* (2013.01); *F16M 11/32* (2013.01); *F16M 11/42* (2013.01); *B66F 2700/05* (2013.01); *B66F 2700/123* (2013.01)

(58) Field of Classification Search
CPC ...... B66F 3/00; B66F 3/10; B66F 3/28; B66F 7/00; B66F 7/16; B66F 11/00
See application file for complete search history.

(56) References Cited

U.S. PATENT DOCUMENTS

| 3,844,421 | A | 10/1974 | Nielsen et al. |
| 4,030,697 | A | 6/1977 | Robinson |
| 4,200,419 | A | 4/1980 | Rogers, Jr. |
| 5,184,930 | A | 2/1993 | Kuhn |
| 5,425,530 | A | 6/1995 | Daurte |
| 6,024,348 | A | 2/2000 | Ventura et al. |
| 6,193,219 | B1 * | 2/2001 | Belley ..................... E02F 9/003 254/89 H |
| 7,950,635 | B2 | 5/2011 | Proehl |
| 7,988,137 | B2 | 8/2011 | Johnson |
| 8,251,349 | B2 | 8/2012 | Drake |

(Continued)

OTHER PUBLICATIONS

U.S. Appl. No. 15/607,363, filed May 23, 2017, Devices and Systems for Vehicle Restoration and Body Repair.

(Continued)

*Primary Examiner* — Lee D Wilson
(74) *Attorney, Agent, or Firm* — Knobbe, Martens, Olson & Bear, LLP

(57) ABSTRACT

According to some embodiments, a vehicle restoration system comprises a first base unit, a second base unit, a third base unit, and at least a fourth base unit, an adjustment member positioned at each base unit, the adjustment member being configured to support a surface of a vehicle along an upper end of the adjustment member, the jack being configured to selectively change a vertical position of the upper end of the adjustment member, a first side member coupling the first base unit to the second base unit, a second side member coupling the third base unit to the fourth base unit, a first strut coupling the first base unit to the third base unit, and a second strut coupling the second base unit to the fourth base unit.

19 Claims, 8 Drawing Sheets

(56) References Cited

U.S. PATENT DOCUMENTS

| | | | |
|---|---|---|---|
| 8,328,173 B1 | 12/2012 | DesForge et al. | |
| 9,016,664 B1 | 4/2015 | Powers et al. | |
| 9,359,179 B2 | 6/2016 | Krug | |
| 9,694,936 B2* | 7/2017 | DeBattiste | B65D 19/42 |
| 2002/0017637 A1* | 2/2002 | Belley | B66F 7/20 |
| | | | 254/89 H |
| 2007/0022950 A1 | 2/2007 | Livingston | |
| 2015/0232309 A1 | 8/2015 | Jaipaul et al. | |
| 2016/0039647 A1* | 2/2016 | Katerberg | B66F 7/20 |
| | | | 254/93 L |
| 2016/0244204 A1* | 8/2016 | DeBattiste | B65D 19/42 |

OTHER PUBLICATIONS

U.S. Appl. No. 15/666,421, filed Aug. 1, 2017, Methods Facilitating Vehicle Restoration and Body Repair.

Product Summary in 1 page related to a Universal Vehicle Body Cart, retrieved at www.eastwood.com (retrieved on or about Aug. 2017 from a site archived on Jan. 1, 2011).

Product Summary in 15 pages related to a Fleetline Body Cart, retrieved at www.chevybombs.com (retrieved on or about Aug. 2017 from a site dated Nov. 17, 2013).

* cited by examiner

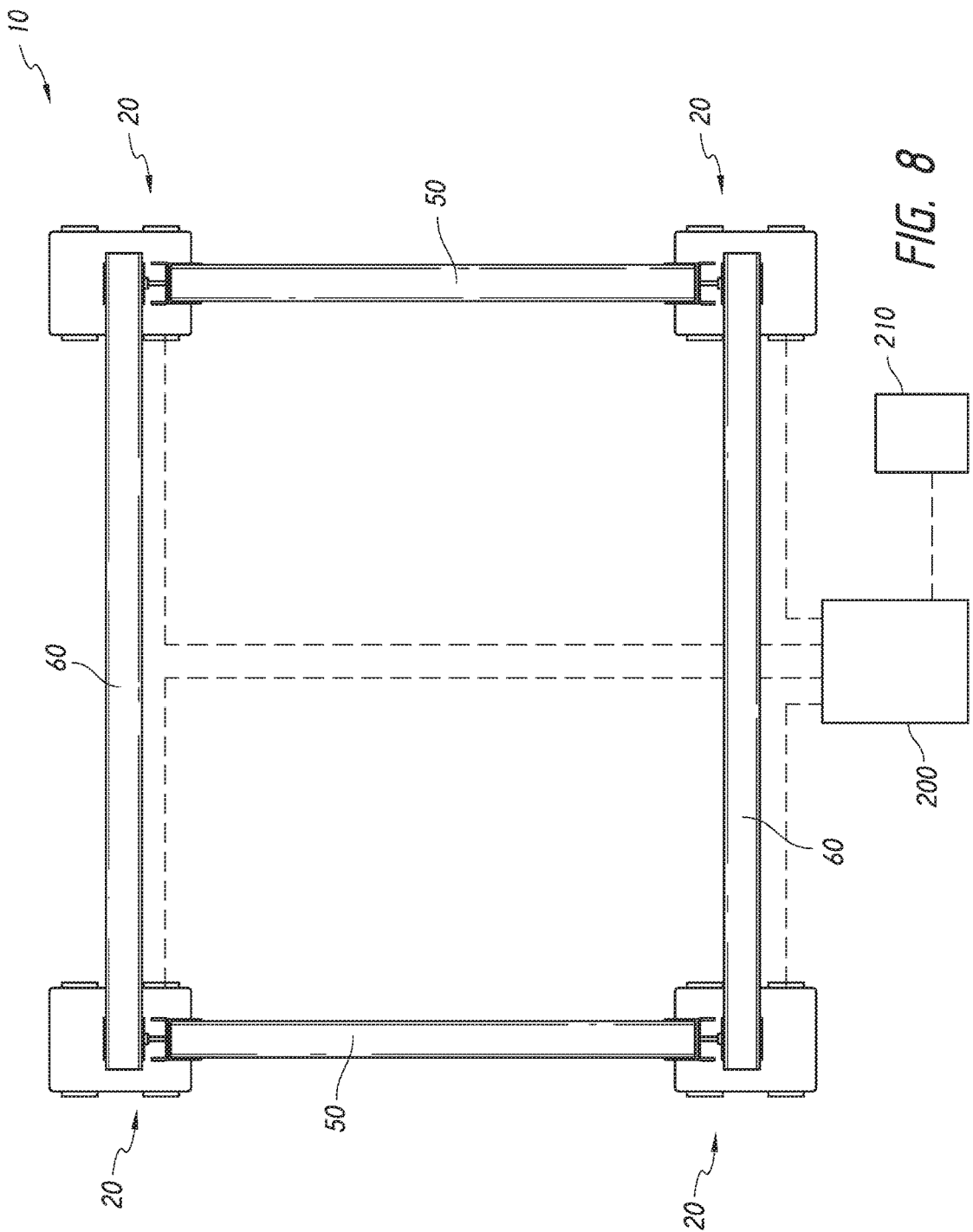

DEVICES AND SYSTEMS FOR VEHICLE RESTORATION AND BODY REPAIR

CROSS-REFERENCE TO RELATED APPLICATIONS

This application claims the priority benefit of U.S. Provisional Patent Application No. 62/505,084, filed May 11, 2017, the entirety of which is hereby incorporated by reference herein.

BACKGROUND

Field

This application relates generally to devices, systems and methods for facilitating procedures related to restoration and other body work and repairs (e.g., mechanical repairs) for automobiles, trucks, other vehicles and the like.

Description of the Related Art

Vehicle restoration procedures using traditional techniques and methods require a great deal of manpower (usually using several different people), are time-consuming, dangerous and tedious. Relatedly, a large footprint from a space perspective is required to remove certain components and store them while work is being performed on a different portion of the vehicle. Thus, a need exists for an efficient, safe and reliable system to facilitate vehicle restoration and repair (e.g., mechanical repair) procedures, other body work projects involving vehicles and the like.

SUMMARY

According to some embodiments, a vehicle restoration system comprises a first base unit, a second base unit, a third base unit, and at least a fourth base unit, an adjustment member positioned at each base unit, the adjustment member being configured to support a surface of a vehicle along an upper end of the adjustment member, the jack being configured to selectively change a vertical position of the upper end of the adjustment member, a first side member coupling the first base unit to the second base unit, a second side member coupling the third base unit to the fourth base unit, a first strut coupling the first base unit to the third base unit, a second strut coupling the second base unit to the fourth base unit, wherein, when the system is assembled, the system forms a rectangular shape, such that the first and second side members are parallel to each other, and the first and second struts are parallel to each other, wherein the first and second side members provide stability to the system, wherein the first and second struts are configured to support and selectively raise and lower at least a portion of a vehicle and wherein each of the first and second struts are positioned above each of the first and second side members.

According to some embodiments, the adjustment members comprise hydraulic, pneumatic or other types of jacks. In some embodiments, the first and second side members comprise aluminum, steel or other metal or alloy. In some embodiments, the first and second side members comprise hollow tubes (e.g., tubes with square or rectangular cross sectional areas), channels, I-beams, flat members and/or the like. In some embodiments, the first and second side members are adjustable in length (e.g., using a hole/pin arrangement). In other embodiments, the first and second side members are fixed in length.

According to some embodiments, the first and second struts comprise aluminum, steel, other metal or alloy, wood and/or any other material. In some embodiments, the first and second struts comprise hollow tubes (e.g., tubes with square or rectangular cross sectional areas), channels, I-beams, flat members and/or the like. In some embodiments, the first and second struts are adjustable in length (e.g., using a hole/pin arrangement). In other embodiments, the first and second struts are fixed in length. In some embodiments, the first and second struts comprise one or more anti-skid coatings, layers, members or features (e.g., rubber, tactile features, etc.).

According to some embodiments, each of the base units comprises casters or other wheels to facilitate movement of the system relative to a ground surface. In some embodiments, the adjustment members are configured to be moved collectively at the same time. In some embodiments, the adjustment members are configured to be moved individually.

According to some embodiments, the system additionally comprises a controller associated with each adjustment member, the controller being configured to adjust the vertical location of the upper end of the adjustment member. In one embodiment, the system further comprises a central controller that is configured to adjust the vertical location of the upper end of each of the adjustment members.

According to some embodiments, the central controller is configured to operatively couple to a remote controller. In some embodiments, the remote controller is part of the system. In other arrangements, the remote controller is separate of the system. In some embodiments, the remote controller comprises a smartphone, a tablet, a laptop or another computing device.

According to some embodiments, a method of selectively raising and lowering at least a portion of a vehicle comprises positioning a first strut and a second strut of a restoration system beneath at least a portion of the vehicle configured to be moved, wherein the restoration system comprises a plurality of adjustment members, each of the adjustment members being coupled to the first strut or the second strut, and wherein the adjustment members are configured to selectively raise or lower at least one of the first strut and the second strut. The method further comprises vertically modifying at least one of the adjustment members to selectively raise or lower at least one of the first strut and the second strut, and thus, the at least a portion of the vehicle supported by the restoration system.

According to some embodiments, the adjustment members comprise hydraulic or pneumatic jacks, and wherein vertically modifying at least one of the adjustment members comprises actuating said hydraulic or pneumatic jacks. In some embodiments, the method further comprises moving the restoration system relative to a ground surface to move the at least a portion of the vehicle relative to another portion of the vehicle. Is some embodiments, wherein the restoration system is moved relative to a ground surface using casters or wheels positioned along members of the restoration system that comprise the adjustment members. In some embodiments, the method further includes disassembling various components of the restoration system for storage or transportation. In several arrangements, the method additionally comprises assembling various components of the restoration system for use.

BRIEF DESCRIPTION OF THE DRAWINGS

These and other features, aspects and advantages of the present application are described with reference to drawings of certain embodiments, which are intended to illustrate, but not to limit, the present disclosure. It is to be understood that the attached drawings are for the purpose of illustrating concepts disclosed in the present application and may not be to scale.

FIG. 8 illustrates a vehicle restoration system with certain control components according to a different embodiment.

DETAILED DESCRIPTION

The various devices, systems and methods disclosed herein are designed and configured to provide auto restoration enthusiasts and professionals with safe, easy-to-use and inexpensive devices, systems, tools and techniques that facilitate movement and staging of their restoration projects (e.g., between tasks). As a result, such embodiments can advantageously provide improved (e.g., minimally-obstructed) access to various surfaces of an automobile, truck or other vehicle body. Accordingly, the various inventions disclosed herein can provide one or more benefits and advantages, such as, for example, saving time associated with a particular procedure, reducing manpower, improving safety associated with restoration and body work procedures, reducing the space needed for the user, facilitate storage, assembly, disassembly and transportation of the system and its components and/or the like.

As discussed in greater detail below, the devices and systems disclosed herein facilitate procedures related to vehicle (e.g., automobiles, trucks, etc.) restoration, body repair, mechanical repair and/or any other procedure where the vehicle or a portion thereof needs to be raised, lowered or otherwise manipulated (e.g., relative to another portion of the vehicle, the ground, etc.). As noted in greater detail herein, the devices and systems disclosed in this application are very simple, cost-effective, relatively lightweight that facilitates assembly, disassembly, storage, transportation and the like, without taking up a relatively large space (e.g., footprint while assembled or disassembled), without needing the use or incorporating of relatively large pneumatic or hydraulic jacks, hoists, and other jigs, carts and/or other devices or components currently in use today for such procedures.

Figure 1:
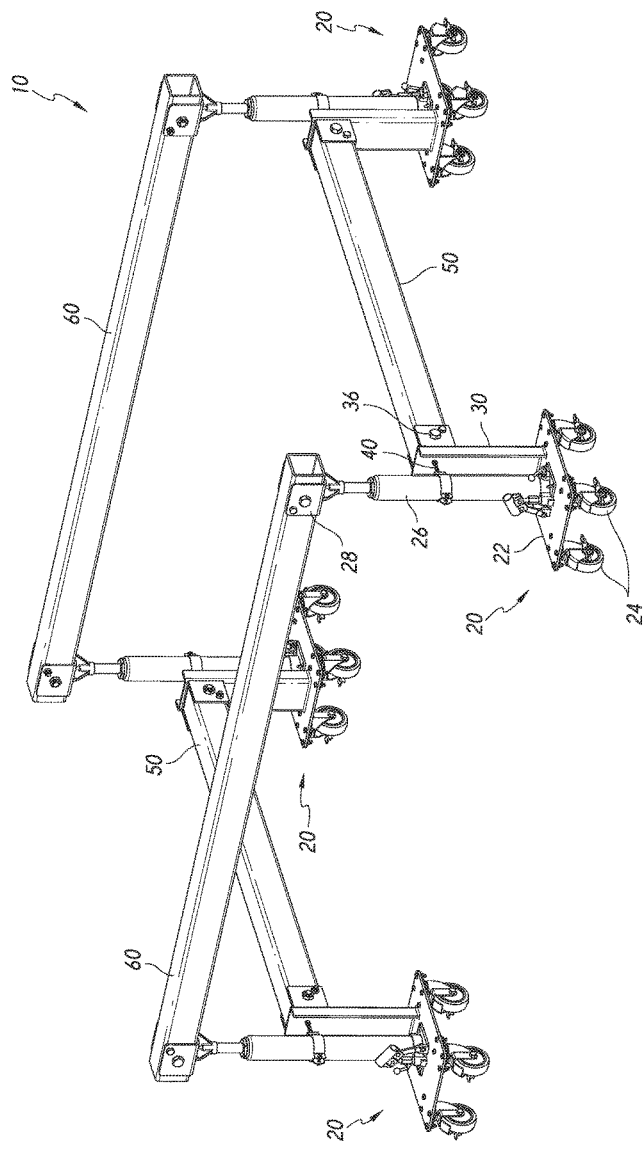
FIG. 1 illustrates a perspective view of one embodiment of a system for vehicle restoration.

FIG. 1 illustrates a perspective view of one embodiment of a vehicle manipulation system 10. As shown, the system 10 includes a total of four base units 20. In the depicted arrangement, each base unit 20 comprises a base plate or base member 22. In order to permit the base units 20 to be movable relative to the ground surface, the base units 20 can include one or more casters, wheels or other devices or components 24 that facilitate movement of the base units 20 (e.g., relative to a ground surface). In the illustrated embodiment, the base units 20 comprise a total of four casters 24 that permit the corresponding base unit 20 to be moved with ease, as desired or required. However, in other embodiments, more or fewer than 4 casters or other devices (e.g., 1, 2, 3, 5, 6, 7, 8, more than 8, etc.) can be used. For example, in some embodiments, the base units can each include five casters or wheels 24. In one embodiment, there is one caster or wheel at or near each corner of the base members and a fifth caster or wheel along the center. Such a configuration can, in some arrangements, prevent or reduce the likelihood of sagging or similar deflection of the base member.

According to some embodiments, the casters or other wheels or movable members 24 of the base units 20 are fastened to corresponding base plates 22 with bolts and nuts and/or mechanical fasteners. However, in other embodiments, other types of attachment methods or devices can be used, such as, for example, welds, tabs, threaded connections, other mechanical connections and/or the like, as desired or required.

Regardless of their exact design and/or configuration, the base units 20 can be configured to be selectively moved (e.g., in unison, together with the entire system 10, etc.) along or relative to a ground surface to quickly and easily position and/or re-position the system 10 in a desired location. In some embodiments, each of the casters, other wheels or other movable members 24 can be moved in a desired direction or orientation. In some arrangements, one or more (e.g., all) the casters or other movable members 24 can be locked (e.g., releasably locked, locally, remotely, etc.) to permit the location of the system 10 to be fixed (e.g., at least temporarily) while a particular procedure (e.g., restoration, body work, etc.) is being conducted.

With further attention to FIG. 1, each of the base units 20 can be positioned along corresponding corners or other peripheral portions of the system 10. In other words, as illustrated in FIG. 1, the system 10 can comprise a generally rectangular overall scheme (e.g., where a base unit 20 is included in a corner of the system). However, in other embodiments, the overall shape and orientation of the base units 20 can be different than illustrated herein. For example, in some embodiments, the overall shape of the system 10 can be triangular, pentagonal, hexagonal, other polygonal, circular, oval, other rounded shape, irregular and/or the like, as desired or required.

Figure 2:
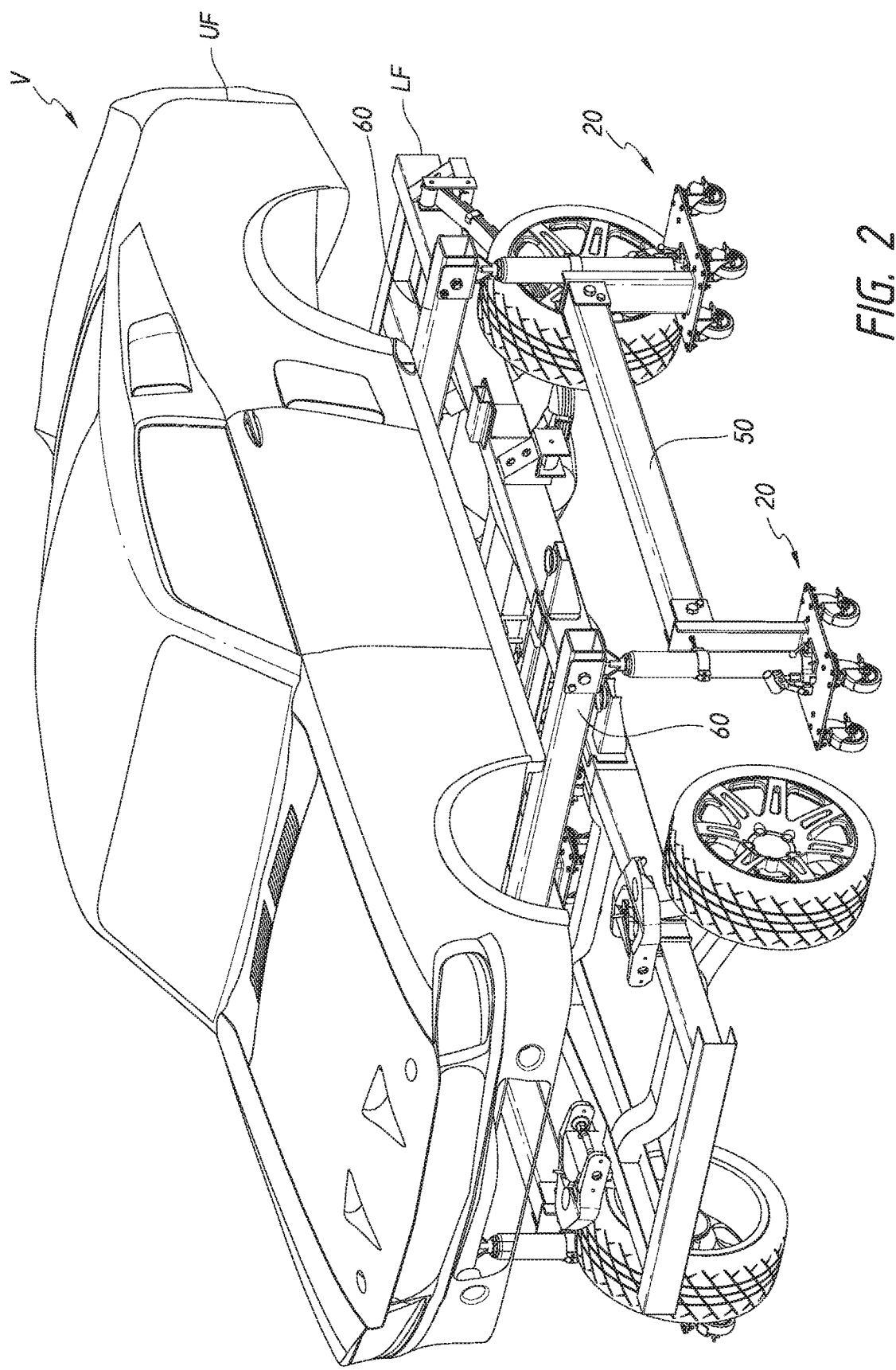
FIG. 2 illustrates a perspective view of the system of FIG. 1 being used to raise an upper frame of a vehicle relative to a lower frame in a first, lower orientation.
Figure 3:
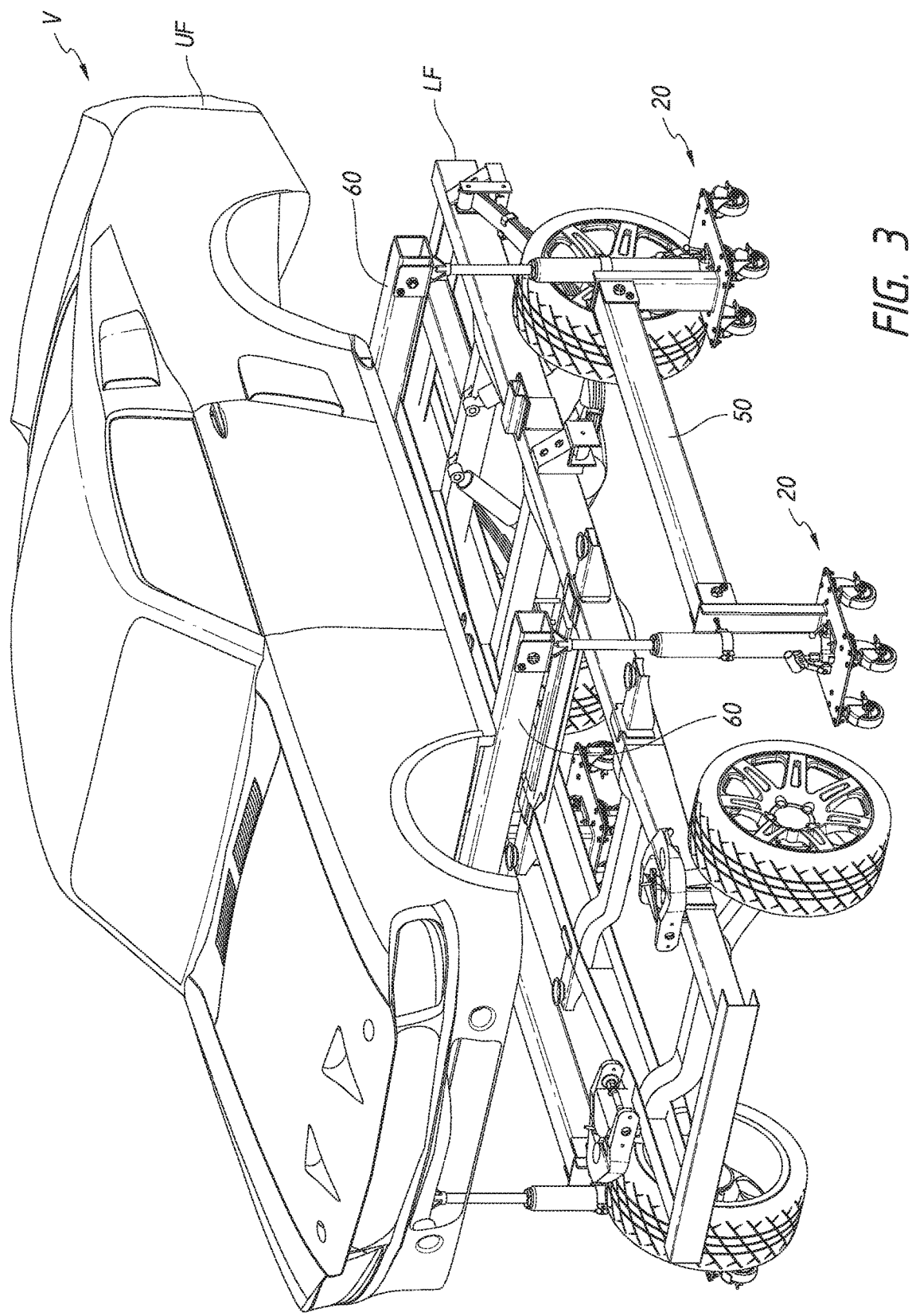
FIG. 3 illustrates a perspective view of the system of FIG. 1 being used to raise an upper frame of a vehicle relative to a lower frame in a second, higher orientation.

As illustrated in FIGS. 2 and 3, once properly positioned relative to an automobile, truck or other vehicle on which the system 10 will be used (e.g., to perform a restoration procedure, body work, other remodeling task, etc.), the system can be manipulated (e.g., selectively raised, lowered, etc.) to move one or more portions or components of the vehicle relative to another and/or to a ground surface (e.g., to raise or lower an entire portion, section of the vehicle and/or the entire vehicle relative to a ground surface or some other reference point). In some embodiments, such configurations can permit the user to selectively move one portion of the vehicle frame (e.g., the upper frame UF relative to the lower frame LF), as indicated in FIGS. 2 and 3. As discussed in greater detail herein, separation of the upper frame from the lower frame can assist the user in conducting a necessary restoration, body work and/or other procedure.

In a complete auto restoration, the vehicle body is typically separated from the frame, so that the various parts, components, systems and surfaces can be repaired, replaced, prepped, and painted. In various embodiments, one or more of the configurations of the system 10 disclosed herein allow either the frame or the vehicle body to be moved, while the other component remains in place. Repairs and restoration activities involving the vehicle frame or chassis can include the rear end and housing, transmission, braking systems, linkages, exhaust systems, suspensions, cabling, electrical wiring, motor mounts, rubber parts and/or the like. Repairs and restoration activities involving the vehicle body include, but are not limited to, sanding, sandblasting, painting, powder coating, chrome, plastic and/or rubber trim pieces. This list is not intended to be exhaustive, but serves to illustrate the complexity and large number of parts, components, systems and processes involved in an auto restoration and/or other procedure in which the systems 10 disclosed herein could be utilized.

With continued reference to FIGS. 1 to 3, the system 10 can include side members 50 and cross-members or struts 60 that connect and couple the various base members 20 to one another. Thus, in some embodiments, as illustrated in the fully-assembled version of the device 10, the device 10 can include a generally rectangular shape, as noted above. However, as also noted above, the overall shape of the system 10 can be different, as desired or required. In other arrangements, the system 10 can include one or more additional components or structures, e.g., to further stabilize the system and/or to provide additional benefits, goals or advantages. For example, in some embodiments, the system can include one or more diagonal members (e.g., struts, other rigid or semi-rigid members, etc.) that diagonally connect or otherwise couple (e.g., directly or indirectly) two or more of the base members 20. This can help enhance the lateral and/or other stability of the system 10 and/or provide additional benefits or advantages to the system and/or to the procedure being performed by a user using the system.

As illustrated in FIGS. 1 to 3, during use, in some embodiments, the side members 50 are configured to be positioned along each side of the vehicle V, while the cross-members 60 are configured to be positioned perpendicular to the side members 50. For example, the cross-members 60 are adapted to extend laterally across and underneath the automobile or other vehicle being manipulated using the system 10. As will be discussed in greater detail herein, the cross-members 60 are sized, shaped, constructed, designed and otherwise configured to support the portion of the vehicle (e.g., an upper frame UF of an automobile) being supported, moved, raised or lowered.

Figure 4:
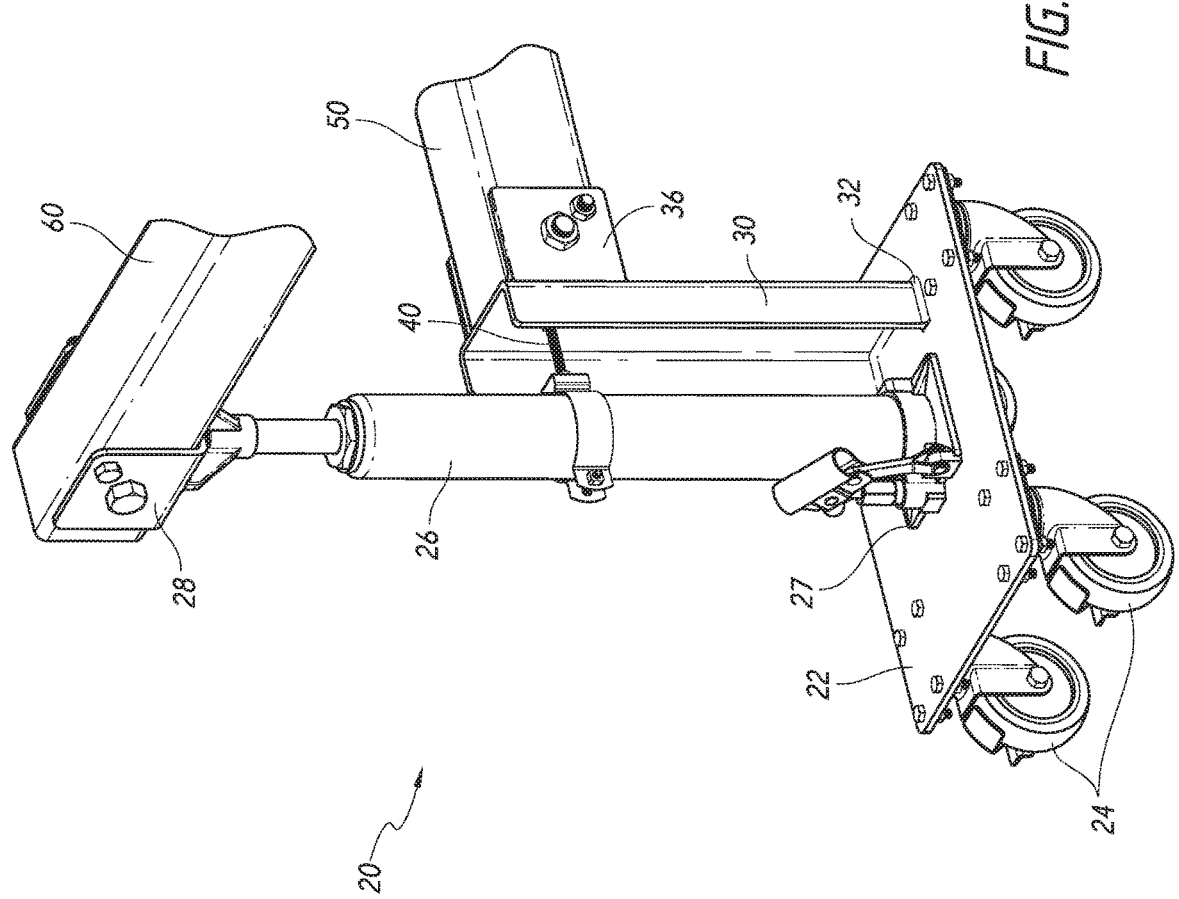
FIG. 4 illustrates a detailed perspective view of a base unit used in the system of FIGS. 1 to 3.

With continued reference to FIG. 4, and further to the discussion above, each base unit 20 can include four casters, wheels or other movable members 24 that enable the base units 20 to be moved (e.g., independently of each other, together or in unison, etc.), as desired or required. In some embodiments, the casters or other movable members 24 are secured to adjacent base plates or other base members 22. As illustrated in the depicted embodiment, the casters 24 can be secured to the adjacent base member 22 using one or more mechanical connection (e.g., nuts and bolts, tabs, flanges, rivets, other fasteners, etc.). However, any other attachment methods or devices are also possible, such as, for example and without limitation, welds, snap fit or friction fit connections, adhesives, etc. In other embodiments, the base units 20 are manufactured with the casters (and/or other movable members) 24 incorporated into the base members 22 as a monolithic of unitary member.

According to some arrangements, the casters, wheels or other movable members 24 are configured to rotate 360 degrees, facilitating unrestricted, multi-directional movement—forward, backward and laterally. However, in other configurations, the movement of the casters or other movable members 24 can be more restricted (e.g., to prevent certain undesired movements). In some embodiments, the casters 24 are 3 inches in diameter; however any other size or type of casters, wheels or other movable members can be used in the base units 20. For example, the diameter of the casters or wheels 24 can be between 1 and 6 inches (e.g., 1, 2, 3, 4, 5, 6 inches, diameters between the foregoing values, etc.), smaller than 1 inch, or larger than 6 inches (e.g., 6-8 8-10, 10-12 inches, etc.), as desired or required.

One, some or all (e.g., all 16 in the depicted embodiment) of the casters, wheels or other movable members 24 can be configured to be selectively locked in a manner that prevent free rotation and/or other movement of the caster relative to the adjacent ground surface on which it is positioned. Such locking mechanism can include, but is not limited to, a local brake (e.g., lever-operated brake, other friction or mechanical brake or lock, etc.), a lock or brake that is pneumatically or electrically-actuated (e.g., via a solenoid) and/or the like. In some embodiments, the casters 24 can be configured to be locked locally (e.g., at the caster 24 itself) or remotely (e.g., via a controller, remote, smartphone, etc.). As noted above, all casters 24 may have locking mechanisms that allow all of the casters (or other movable members 24) to be locked at the same time. In alternative configurations, one or some of the casters, wheels or other movable members 24 to be locked independently, based on the required stability or the desired limits on the movement of the system. Casters without locking mechanisms may be used, or a combination of locking and unlockable casters may be used.

In some embodiments, the caster, wheels or other movable members 24 comprise ball-bearings (e.g., casters with ball bearings), allowing smoother and precise movement of the system 10. However, in other arrangements, the movable members 24 do not comprise ball bearings.

In some embodiments, the system or assembly 10 includes casters or other wheels 24 that comprise solid rubber. However, the casters 24 can comprise any other type of material, either in addition to or in lieu of rubber, such as, for example and without limitation, polyurethane, polyolefin, other polymeric materials, other synthetic materials, wood or other natural materials, etc. In some embodiments, the casters, wheels or other movable members are solid; while in other embodiments, the casters are inflatable or other air-filled (e.g., thereby permitting the user to vary the inflation level and thus the properties of the casters). In some embodiments, the casters can be easily removed and replaced (e.g., to permit the user to customize the system 10 in light of the conditions, such as the weight to be carried by the system, the surface on which the system is positioned, the desired or required ease of movement of the system relative to the ground surface, etc.).

The base members 22 of the base units 20 can comprise one or more rigid and/or semi-rigid materials, such as, for example, aluminum, steel (stainless steel, other types of steel, etc.), other metals or alloys, polymeric materials, carbon-graphite, fiberglass or other composite materials, wood or other natural materials, etc. In some embodiments, use of aluminum or other materials can provide a desirable combination of relatively low weight materials with relatively high strength characteristics, with low weight and easy to machine characteristics.

In some embodiments, the base members 22 of the base units 20 can be constructed via a variety of manufacturing, assembling and other methods and procedures, including, without limitation, cutting, welding, bolting or via other mechanical fasteners, casting, forging, machining, 3-D printing, molding (e.g., injection molding), extrusion, other processes or technologies and/or combinations thereof.

According to some embodiments, the dimensions of the base members 22 are 10 to 14 inches long (e.g., 10, 11, 12, 13, 14 inches, dimensions between the foregoing, etc.) by 10 to 14 inches wide (e.g., 10, 11, 12, 13, 14 inches, dimensions between the foregoing, etc.). In other embodiments, however, the length and/or width can be less than 10 inches (e.g., 2-6, 6-8, 8-10 inches, dimensions between the foregoing ranges, etc.) or greater than 14 inches (e.g., 14-16, 16-18, 18-20 inches, dimensions between the foregoing ranges, greater than 20 inches, etc.), as desired or required by a particular application or use. Further, the thickness of the base member 22 can be ⅜ inch; however, in other embodiments, the thickness of the base member 22 can be 0.125 to 3 inches (e.g., 0.125-0.25, 0.25-0.5, 0.5-0.75, 0.75-1, 1-1.5, 1.5-2, 2-3 inches, thicknesses between the foregoing ranges, etc.), etc. For example, the thickness of the base member 22 can vary as desired or required for a specific application, strength requirement, appearance preference and/or any other consideration. One or more surfaces (e.g., the top surface) of the base members 22 can be polished, painted, matte, tinted, powder coated, etc. Such surface(s) can include decals, logos, etchings, anti-skid features, other design enhancements and/or the like, as desired or required. In some embodiments, the base members 22 and/or any other portion of the base units 20 can comprise thicker components to accommodate greater weight, as desired or required.

With continued reference to FIG. 4, as well as other figures showing the base members 20, each base member can comprise a jack, hydraulic lift or other device 26 designed and configured to be raised or lowered (e.g., to raise or lower the portion of the automobile, other vehicle and/or other member that the system or assembly 10 is configured to manipulate). As depicted in the figures, each jack 26 can be secured to the top of the corresponding base member 22. The jacks 26 can be secured to the base members 22 using any suitable attachment method, device or technology, such as, for example, welds, bolts, other mechanical fasteners and/or the like. In some embodiments, the jacks 26 are permanently or removably secured to the base embers 22. Thus, with respect to removable configurations, a jack can be removed and replaced. This can facilitate repairs, maintenance, customization, transportation, storage and other procedures associated with the systems or assembly 10. In some embodiments, the jacks are secured to the top (e.g., the top surface) of the corresponding base member 22; however, the jack can be attached to any other portion of the base member, either in lieu of or in addition to the top surface.

The jacks or other vertically adjustable members 26 can be vertically standing jacks, with dampening characteristics. This can permit the user to raise and lower the portion of the automobile or other vehicle to a desired height, smoothly and with relative ease. In some embodiments, the jacks 26 can be raised or lowered independently or in unison. For example, two, three or four (or more, if the system comprises more than 4 base units 20) of the jacks 26 can be raised and/or lowered identically or in unison. Accordingly, the jacks 26, and thus the vehicle component(s) (e.g., upper frame, lower frame, the entire vehicle, etc.), can be lowered uniformly or differentially, as desired or required. For example, the jacks 26 can be moved so as to lift the vehicle portion uniformly up and/or down or they can be moved to create a desired tilt or relative rotation.

Any variety of methods, devices and/or technologies can be used to operate (e.g., actuate, power, etc.) the jacks 26. For example, in some embodiments, an automatic controller and compressor can be used to regulate the height pneumatically. However, in some arrangements, a hydraulic pump system, an electric power system (e.g., an electric motor, an electromechanical device, etc.), a manual system (e.g., hand-operated jack, such as a circular motion hand-crank, a lever inserted into the jack that is manipulated (e.g., pushed downwardly), etc.) and/or any other device or system can be used to raise and lower jacks, and thus, the vehicle or vehicle component(s) supported by the system or assembly 10. Regardless of the exact device or technology used to conduct the desired or necessary height adjustment, the jacks can be configured to be raised or lower continuously (smoothly), incrementally (e.g., between various set heights), slowly, quickly and/or the like.

In some embodiments, other types of jacks or vertical adjustment devices 26 can be incorporated into a system or assembly 10. For example, non-vertical jacks or other position adjustment devices (e.g., jacks or devices that move diagonally) can be used. In some embodiments, the jacks or other adjustment devices are selected so as to provide improved (e.g., easier) access to various surfaces of the vehicle or other objects to be manipulated by the system or assembly. For example, the jacks can be selected to facilitate moving the vehicle or other object non-uniformly (e.g., at a certain tilt or angle), as desired or required.

In some embodiments, each jack or other adjustment device 26 is configured to accommodate (e.g., has a rated lifting capacity of) 500 to 4,000 pounds (e.g., 500, 1,000, 1,500, 2,000, 2,500, 3,000, 3,500, 4,000, 5,000 pounds, weights between the foregoing values, etc.). However, in other embodiments, each jack 26 can be configured to accommodate (e.g., include a rating of) less than 500 pounds or greater than 5,000 pounds (e.g., 5,000-7,500, 7,500-10,000, 10,000-20,000 pounds, greater than 20,000 pounds, etc.). Thus, the system or assembly 10 can be used for different types of vehicles or objects, including large trucks, construction vehicles, other large/heavy objects, special projects and the like.

According to some arrangements, the jacks or other adjustable members 26 are configured to raise/lower the vehicle body or other object from between 24 inches and 48 inches (e.g., 27 to 45 inches, 32 to 40 inches, 30 to 42 inches, ranges between the foregoing, etc.). For example, in some embodiments, such a vertical range can help clear the rear end assembly and the front "A" arm of a vehicle.

In some embodiments, the systems and assemblies 10 disclosed herein can be configured without jacks or other adjustable (e.g., vertically-adjustable) members. For example, the system 10 can be adapted to permit the multi-directional movement of the vehicle or vehicle components (or any other object) supported by the system without the need to raise or lower the supported items. Thus, staging of a restoration, body work or other project can be facilitated, allowing improved access to certain portions or areas of the supported item(s), e.g., the top and upper areas of a vehicle or other object while providing a safe and easily movable, and if desired, lockable, system to support and secure the item(s) being manipulated.

With reference to FIGS. 1 and 4, each base unit 20 can be configured to secure to a corresponding side member 50. For example, as shown, the depicted embodiment comprises an integrated, raised support member 30 comprising a retaining member (e.g., u-shaped bracket) 36. As shown, the bracket support member 30, and thus the bracket 36 of the support member 30, is spaced apart from the jack 26. The bracket can be sized, shaped and otherwise configured to receive a side member or rail 50. The bracket 36 can be adapted to secure to the corresponding side member 50 using bolts, other fasteners, tabs or mechanical connections, welds and/or any other attachment devices, features or methods. In some embodiments, the use of side members or rails 50 that connect each of the two pairs of base units 20 located along the sides of the vehicle V can help align and stabilize the system or assembly 10 during use. For example, the side members 50 can help ensure that base units 20 located on each side of the vehicle V or other object being supported/manipulated by the system 10 remain properly positioned relative to the vehicle or other object (e.g., they do not move undesirably to undermine or otherwise present problems to the user during a particular restoration or other procedure).

In some embodiments, the brackets 36 that support the side members 50 are 1 to 6 inches (e.g., 1-2, 2-3, 3-4, 4-5, 5-6 inches, dimensions between the foregoing, etc.) wide and 1 to 6 inches (e.g., 1-2, 2-3, 3-4, 4-5, 5-6 inches, dimensions between the foregoing, etc.) deep. However, in other embodiments, the width, length and/or other dimensions of the brackets 36 can vary, as desired or required for a particular application or use. Further, as noted, other types of devices, features and/or adaptations can be used to secure the side members 50 to the corresponding base units 20. For instance, the side member 50 can be attached directly to the jack or other adjustment member 26, can be secured directly to the base member 22, can be secured to another part of each base unit 20 and/or the like, depending on the specific project requirements.

With continued reference to FIG. 1, in some arrangements, the system or assembly 10 comprises two side members or rails 50. For example, as shown, a left side member or rail 50 runs lengthwise along the left side of the vehicle V or other object being supported by the system 10, and a right side member or rail 50 runs lengthwise along the right side of the vehicle or other object. In some embodiments, the side members or rails 50 are sized, shaped and otherwise configured to fit and rest (e.g., snugly) into the brackets or other receiving members 36 of the corresponding base unit 20. However, as noted in greater detail above, other types of permanent or releasable connections can be used to secure the side members or rails 50 to the base units 20. In some arrangements, both the left and right side members 50 extend from a front to a rear location of the vehicle or other object for which the system or assembly 10 is being used. Thus, the side member 50 can advantageously form two sides of a rectangle (e.g., square) for the overall system or assembly 10 that enhances rigidity, strength and stability, and facilitates safe and secure movement of the system 10 and eliminates or reduces the likelihood of undesired movement of the vehicle or other object that is being supported by the system 10.

In some embodiments, the side members or rails 50 are positioned lengthwise, and are designed to span the distance between the front and back wheel wells of the vehicle V. For example, the side members 50 can be sized, shaped and otherwise configured to extend between the locations designated by the manufacturer of the vehicle as "jacking points," or "lifting areas." Thus, the side members 50 ensure that the base units 20 (e.g., specifically the jacks or other adjustment members 26 of the base unit) are positioned along recommended locations of the vehicle V for safely raising and lowering the vehicle. Since these recommended locations can vary from vehicle to vehicle, the side members or rails 50 can be configured to have an adjustable length. This can advantageously permit a user to make the necessary modifications before each use to ensure the system or assembly 10 is customized for efficient and safe use. As discussed in greater detail below, the system 10 can also be configured to permit the lateral dimension (width or distance between left and right side members 50) to be adjustable to also accommodate for various vehicles and other objects, as the target jacking or lifting locations of a vehicle or other object can also vary with respect to this other (lateral or cross-sectional) direction.

In some embodiments, the side members or rails 50 can be 3 to 6 feet long (e.g., 3-3.5, 3.5-4, 4-4.5, 4.5-5, 5-5.5, 5.5-6 feet, lengths between the foregoing ranges, etc.). In other configurations, the length of the side members 50 is shorter than 3 feet (e.g., 1-2, 2-3 feet, less than 1 foot, etc.) or greater than 6 feet (e.g., 6-7, 7-8, 8-9, 9-10, 10-15 feet, greater than 15 feet, etc.), as desired or required. The lengths provided above are in reference to the specific embodiments disclosed herein, where the termination points of the side members are very close to the jacks 26. Thus, in some embodiments, dimensions above are intended to denote the separation distances of the jacks or other adjustable member 26 (e.g., along each side of the vehicle V or other member). Also, as noted above, may be configured to be lengthened or shortened to accommodate the requirements of a specific project.

The side members or rails 50 can be positioned 4 to 36 inches (e.g., 6 to 24 inches, 10 to 20 inches, 4-6, 6-8, 8-10, 10-12, 12-14, 14-16, 16-18, 18-20, 20-22, 22-24, 24-28, 28-36 inches, distances between the foregoing, etc.) from, or outside of, the periphery or edge of the vehicle or other object being supported by the system or assembly 10, thereby enabling and/or facilitating the vehicle or other object to be moved and otherwise manipulated with relative ease, reducing the overall footprint or area occupied by the system, minimizing or reducing the obstructed access to the surfaces of the vehicle or other object and/or providing additional advantages or benefits.

In some embodiments, the side members or rails 50 comprise hollow, square members (e.g., hollow or solid, square aluminum members). In some embodiments, the side members 50 comprise square members that are 4 inches by 4 inches in size. In some configurations, the side members or rails may be 2.5 to 5 inches (e.g., 2.5, 3, 3.5, 4, 4.5, 5 inches, values between the foregoing, etc.) in size. However, the size, shape, material and/or other properties of the side members 50 can vary, as desired or required. For example, the side members can comprise any other material, such as, for example, steel (e.g., stainless steel, carbon steel, etc.), iron, other metals or alloys, wood, carbon fiber, or any other synthetic, composite or natural materials that provide the necessary strength, rigidity, durability and/or other desired structural properties to the system. In some embodiments, the side members 50 comprise shapes that are different than square members. For instance, the side members 50 can include, without limitation, angles, I-beams, channels, bars, tubes (e.g., hollow or solid), dowels or the like.

In some embodiments, the side members or rails 50 are adjustable in length. For example, the side members 50 can comprise one or more telescoping features or configurations. By way of example, the side members 50 can include telescoping members (e.g., square aluminum members, angles, etc.). For example, in some embodiments, the side member 50 includes pre-drilled holes in the square, angle, channel or any other structural components that is used for the side member. Such holes can facilitate quick and easy adjustments to the length of the corresponding side members 50. As a result, the side members, and thus the system or assembly 10, can be customized for a particular vehicle or other use. In some embodiments, a telescoping-type side member with holes or other adjustment features comprises a pin or other member that can be used to selectively lock and unlock the member 50. Thus, the pin or other member can be removed or otherwise disengaged relative to the openings of the member 50 to permit the user to adjust (e.g., shorten or lengthen) the side member 50, and replaced or otherwise engaged relative to the openings of the member to fix the length of the member. In other embodiments, other types of locking mechanisms can be used to permit adjustability of the side members 50. For example, a spring-activated pin can be depressed to unlock the side members. In such embodiments, the pin remains secured to the side member at all times. Any other type of pins or other locking and unlocking mechanism can be used, such as for example, a cotter pins, a nut and bolt, a telescoping clamping mechanism (e.g., that permits free adjustment without being limited to discrete positions otherwise controlled by hole location) and/or the like. In some embodiments, the length of the side member or rail 50 can be advantageously modified (e.g., selectively unlocked and locked) using only a single hand.

With continued reference to FIG. 4, as discussed above, the base unit 20 can comprise a retaining member (e.g., u-shaped bracket) 36. In some arrangements, as in those illustrated herein, the bracket or other retaining member 36 is secured to a support member 30 (e.g., a raised support channel or other member) that extends from the base plate 22 or other portion of the base unit 20. However, in other embodiments, the bracket or other retaining member 36 that is configured to receive and connect to a side member or rail 50 can be secured directly to the base plate 22. Thus, the bracket or other retaining member 36 can be directly or indirectly attached to the base plate 22 of the base unit 20, as desired or required.

As shown, the bracket or other retaining member 36 can comprise a clamp, channel or other member or features that helps secure the side member or rail 50 to the corresponding base unit 20. In some embodiments, as noted in greater detail herein, coupling side rails or members 50 to the base units, and thus to the jacks or other adjustment members 26, can help improve the stability, strength, safety and other aspects, laterally, longitudinally, etc., of the entire system or assembly 10. The clamps or other portions of the bracket or other retaining member 36 can include hose clamps, channels and/or any other member or feature. As shown, in some embodiments, the clamps or other portion of the retaining members 36 can be configured to secure an adjacent portion of the side member or rail 50 using bolts, clips, other fasteners and/or any other type of attachment device, feature or method. In some embodiments, the side members 50 are configured to fit (e.g., loosely or snugly) into a clamp or other portion or feature of the bracket or other retaining member 36 of the base units 20. For some heavier duty applications, a second side rail or member 50 can be secured to the right and/or the left side base units 20, e.g., to provide additional stability, strength, rigidity and/or other desired characteristics.

Figure 5:
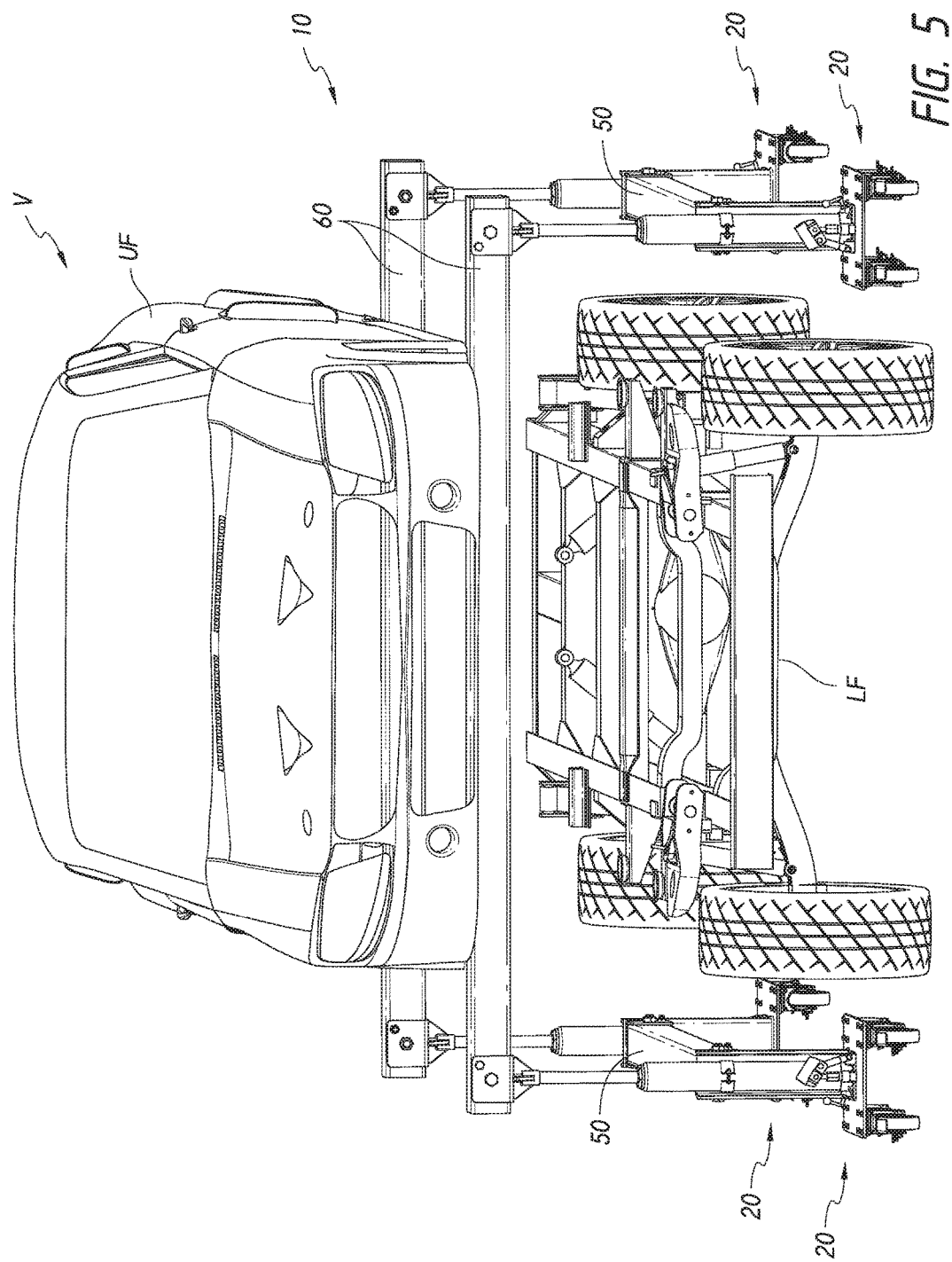
FIG. 5 illustrates a front perspective view of the system of FIG. 1 in use.
Figure 6:
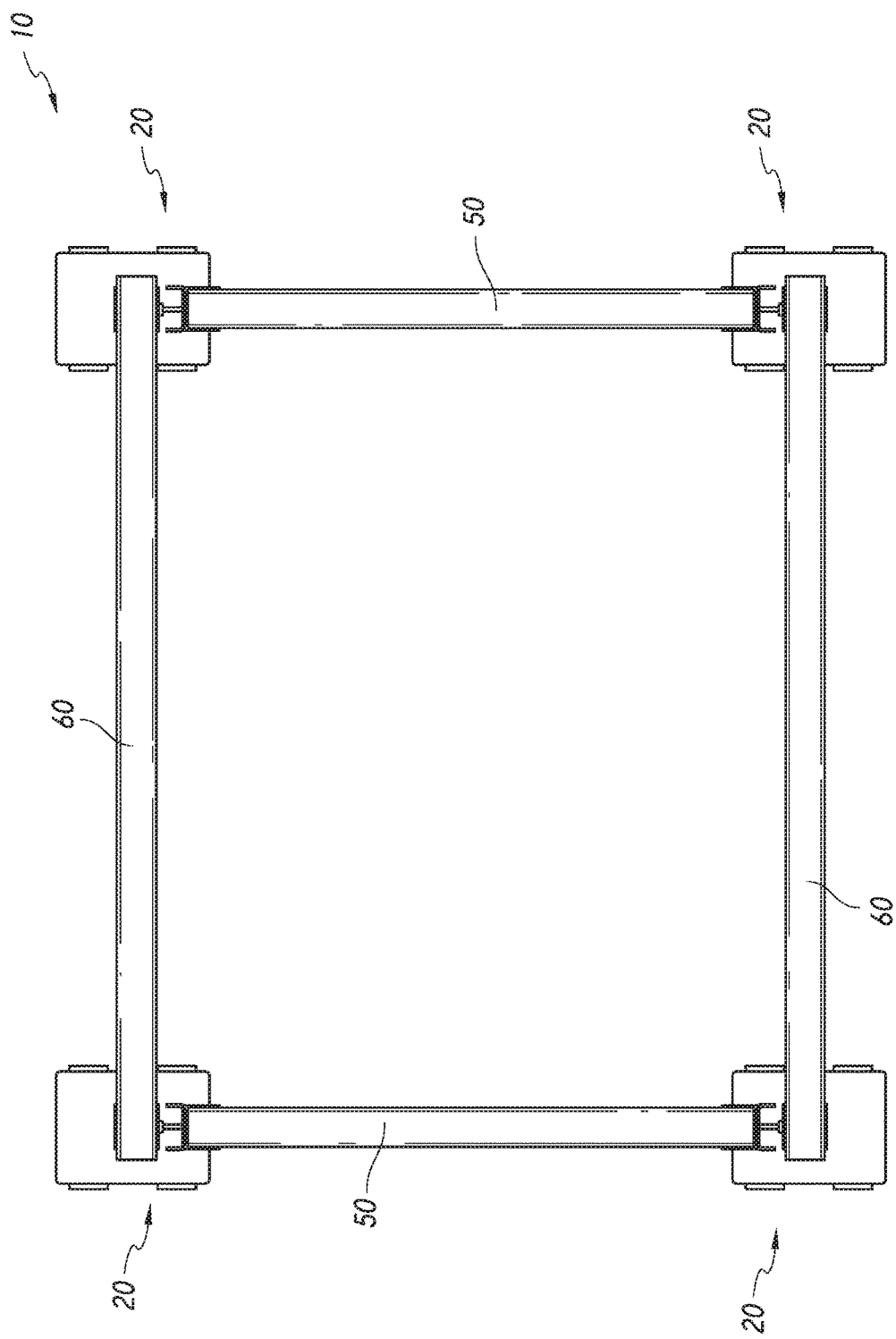
FIG. 6 illustrates a front view of the embodiment of the vehicle restoration system illustrated in FIG. 1.

With continued reference to FIG. 1, the system or assembly 10 can include cross-members or struts 60 that extend laterally to join the base units 20 in a direction generally perpendicular to the side members or rails 50. As illustrated in FIGS. 2, 3 and 5, the struts 60 are configured to be positioned underneath and to support a portion of the vehicle or other item (e.g., an upper frame or portion UF of a car). Thus, in some embodiments, the struts 60 are sized, shaped and otherwise manufactured and configured to support the weight of the vehicle (or portion thereof) and/or any other item for which the system or assembly 10 is being used. In some arrangements, the struts 60 are between 36 to 80 inches long (e.g., 42 to 72, 46 to 66, 36 to 38, 38 to 40, 40 to 42, 42 to 44, 44 to 46, 46 to 48, 48 to 50, 50 to 52, 52 to 54, 54 to 56, 56 to 58, 58 to 60, 60 to 62, 62 to 64, 64 to 66, 66 to 68, 68 to 70, 70 to 72, 72 to 74, 74 to 76, 76 to 78, 78 to 80 inches, lengths between the foregoing ranges, etc.). Depending on the specific configuration of the assembly 10 generally and the base units more particularly, this distance can be the actual length of the strut (e.g., from end to end) or it can be the separation distance between the jacks or other adjustment members 26 of corresponding base units 20 to which the struts 60 are coupled. Similar to the side members or rails 50, as discussed in greater detail above, the struts or cross-members can be configured such that their length can be adjusted (e.g., selectively lengthened or shortened), as desired or required to customize the assembly 10 for a particular purpose or application. In some embodiments, the struts 60 can be sized and configured to extend beyond the periphery (e.g., lateral edge) of the vehicle or other object being supported by the system or assembly 10 by 6 to 36 inches (e.g., 12 to 24, 68, 8-10, 10-12, 12-14, 14-16, 16-18, 18-20, 20-22, 22-24, 24-26, 26-28, 28-30, 30-32, 32-34, 34-36 inches, lengths between the foregoing ranges, etc.), less than 10 inches, more than 36 inches, as desired or required. In some embodiments, the distance by which the struts or cross-members 60 extend past the periphery (e.g., left and/or right edge of the vehicle or other object being supported by the system or assembly) can be varied by the user, as desired or required.

As shown, for example, in FIGS. 1 and 4, the jack or other adjustment member 26 of each base unit 20 can comprise a strut bracket 28. In some embodiments, as depicted herein, such strut brackets 28 can be positioned along the top of the corresponding jack or other adjustment member 26. In other arrangements, however, the strut brackets 28 can be located along any other portion of the jack or other adjustment member 26 (e.g., at or near the side of the jack). In some embodiments, the strut brackets 28 are located at, along or near the top of each jack, e.g., fitting around the round cylinders of the jack housings. The strut brackets 28 can include a channel (C-channel) or any other member or feature configured to receive a corresponding portion of the strut or cross-member 60. For instance, in FIG. 4, the strut 60 is positioned along an open end of a channel or open portion of the strut bracket 28. Thus, in some embodiments, the channel or other strut-receiving portion of the strut bracket 28 can be sized, shaped and otherwise configured to receive (e.g., snugly or loosely) the strut or cross-member 60. In some embodiments, as shown in FIG. 4, one or more bolts, other fasteners and/or any other of attachment device, feature or method can be used to enhance the connection between the strut 60 and the strut bracket 28 of the corresponding base unit 20. Thus, the connection of the struts or cross-members 60 to the base units 20 can be facilitated and made safer, especially while the system or assembly 10 is in use. In some embodiments, as a result of the strut brackets 28, the struts or cross-member function as extensions of the jacks or other adjustment members 26.

As discussed in greater detail herein, the system or assembly 10 is designed and otherwise configured such that the jacks or other adjustment members 26 of any of the base units 20 can be raised or lowered, either independently or together (e.g., in unison or harmony with each other). For example, in some arrangements, the jacks or other adjustment members 26 (and thus, corners of the system or assembly), and thus the struts 60 coupled to the base units 20, can be raised at the same time, at the same rate and/or the like. However, in other embodiments, the adjustment members (and thus, corners of the system or assembly) can be raised non-uniformly. For instance, one, two or three jacks or adjustment members 26 can be at a different elevation and/or can be raised at a different rate or time than one or more adjustment jacks or adjustment members 26 of the system, as desired or required. Accordingly, the system or assembly 10 can be used to raise or lower at least a portion of a vehicle (e.g., an entire car or truck, an upper frame or portion UF of a car or truck relative to a lower frame or portion LF, etc.) uniformly (e.g., straight up and/or down without tilt or angle) or non-uniformly (e.g., at a particular tilt or angle).

According to some arrangements, the struts or cross-members 60 can comprise one or more devices, coatings, layers and/or the like to help ensure that the vehicle or other member being supported on the struts 60 does not move undesirably (e.g., slip) during use of the system or assembly 10. For example, the top surface of struts or cross-members 60 can comprise a thin layer of rubber or other non-slip/non-skid material, thereby making it more difficult or even preventing undesired movement of the vehicle portion or other member supported by the system 10 along or relative to the surface on which such vehicle portion or other member rests. In other embodiments, the strut 60 (e.g., a top surface of the strut) can comprise another type of layer, coating, feature, member and/or the like, either in additional to or in lieu of one or more layers of rubber (e.g., neoprene, other types of rubber, etc.) to prevent or reduce the likelihood of slippage or other undesirable movement of the vehicle or other object being supported by the system 10 during use. For example, the strut can include one or more non-skid features (e.g., bumps, other protruding members, recesses or features, etc., other types of coating or layers, such as thermoplastics, composites, other natural or synthetic materials, etc. roughened surface portions or other high friction characteristics, brackets, clips, other fasteners, magnets and/or the like). In some embodiments, such non-skid or non-slip members, features, characteristics, etc. can be continuously or intermittently applied along the struts or cross-members. In some embodiments, brackets, clips, other mechanical fasteners and/or other non-skid or non-slip features can be adapted to lockingly or otherwise positively engage (e.g., and thus, release) a portion of the vehicle or other object being supported. This can improve safety, enhance the system's ability to manipulate a vehicle or other object (e.g., by allowing greater tilt, other unique movements, etc.) and provide one or more other benefits or advantages. In some embodiments, the rubber layer or other coating, layer or member positioned on one or more surfaces of the struts or cross-members can be configured to provide a desired level of cushioning and protection to the object being supported.

As with the side members or rails 50 described above, the struts or cross-members 60 comprise hollow, square members (e.g., hollow or solid, square aluminum members or other materials, as mentioned herein, or equivalents thereof). In some embodiments, the struts 60 comprise square members that are 4 inches by 4 inches in size. In some configurations, the struts may be a different size, such as, for example 2.5 to 5 inches (e.g., 2.5, 3, 3.5, 4, 4.5, 5 inches, values between the foregoing, etc.), smaller than 2.5 inches, or larger than 5 inches, as required or desired (e.g., to support the vehicle body or other object).

However, the size, shape, material and/or other properties of the struts 60 can vary, as desired or required. For example, the struts or cross-members can comprise any other material, such as, for example, steel (e.g., stainless steel, carbon steel, etc.), iron, other metals or alloys, wood, carbon fiber, or any other synthetic, composite or natural materials that provide the necessary strength, rigidity, durability and/or other desired structural properties to the system. In some embodiments, the struts 60 comprise shapes that are different than square members. For instance, the struts 60 can include, without limitation, angles, I-beams, channels, bars, tubes (e.g., hollow or solid), dowels or the like.

In some embodiments, the struts or cross-members 60 are adjustable in length. For example, the struts 60 can comprise one or more telescoping features or configurations. By way of example, the struts 60 can include telescoping members (e.g., square aluminum members, angles, etc.). In some embodiments, the struts 60 include pre-drilled holes in the square, angle, channel or any other structural components that are used for the strut. Such holes can facilitate quick and easy adjustments to the length of the corresponding struts 60. As a result, the struts, and thus the system or assembly 10, can be customized for a particular vehicle, object or other use. In some embodiments, a telescoping-type strut or cross-member with holes or other adjustment features comprises a pin or other member that can be used to selectively lock and unlock the strut 60. Thus, the pin or other member can be removed or otherwise disengaged relative to the openings of the strut 60 to permit the user to adjust (e.g., shorten or lengthen) the side member 50, and replace or otherwise engage the side member 50 relative to the openings of the strut to fix the length of the strut. In other embodiments, other types of locking mechanisms can be used to permit adjustability of the struts or cross-members 60. For example, a spring-activated pin can be depressed to unlock the struts. In such embodiments, the pin remains secured to the strut at all times. Any other type of pins or other locking and unlocking mechanism can be used, such as for example, a cotter pins, a nut and bolt, a telescoping clamping mechanism (e.g., that permits free adjustment without being limited to discrete positions otherwise controlled by hole location) and/or the like. In some embodiments, the length of the strut or cross-member 60 can be advantageously modified (e.g., selectively unlocked and locked) using only a single hand.

In some embodiments, the side members 50 and the struts 60 are identical in shape, type, size, length, materials use and/or the like. This can allow for the interchangeability of components, and can facilitate manufacturing, assembly, repair and replacement activities and/or the like. However, in other arrangements, the side members 50 and the struts 60 are different in one or more ways (e.g., size, materials, types, length, adjustability, etc.), as desired or required.

If the strut or cross-member 60 is configured to have an adjustable length (e.g., via a telescoping arrangement), any non-skid or non-slip features can be accommodated appropriately for such adjustability. For example, in some embodiments, a rubber or other layer or coating positioned along the top of the strut 60 can include nubs or other features that help seat or nest securely inside the selected, pre-drilled holes, providing additional safety features to prevent or reduce undesirable movement of the system or assembly 10, and provide protection to the surface of the vehicle body or object from potential damage.

As noted above, the struts or cross-members can be sized, shaped and otherwise configured to receive struts or cross-members 60 (e.g., within or near brackets or other strut-receiving members) 28. The struts 60, the jacks or adjustment members 26 and other members or components of the system or assembly 10 can advantageously comprise the strength, durability, stability and other desired and required characteristics to permit the vehicle (or portion thereof) or any other object to be easily and safely manipulated during a restoration, body work or other procedure. For example, the system or assembly 10 can be configured to permit a user to move the vehicle or other object laterally (e.g., in other words, relative to a ground surface), up or down (e.g., using the jacks or adjustment members of the base units 20), at a desired angle and/or the like. The brackets that are configured to receive the struts, side members and/or the like can comprise aluminum, steel, other metals or alloys, carbon fiber and/or any other rigid or semi-rigid material.

In some embodiments, as discussed in other portions of the current application, one or more the brackets or other member-receiving portions of the system 10 (e.g., the brackets 28 that receive struts 60, the brackets 36 that receive side members, etc.) can be configured to provide additional features, devices or components to further ensure that the member being received safely and securely remains within said bracket 28, 36. For example, in some embodiments, a bracket 28, 36 can comprise an opening in (e.g., an eyelet integrated in or separate but secured to) each bracket 28, 36. In some embodiments, such openings (not shown in the accompanying figures) can comprise the same materials that the corresponding bracket comprises. In some embodiments, straps (e.g., nylon straps), wires, zip-ties, cords, ropes and/or any other member (e.g., comprising any suitable material or configuration) can be used to secure the adjacent member received by the bracket (e.g., a strut, a side member, etc.) to the bracket, and thus to the base unit 20. In some embodiments, the openings (e.g., eyelets) are used to fasten one or more connecting members (e.g., straps) across the adjacent portion of the vehicle or other object. For instance, one strap can be positioned across or near the front end or portion of the vehicle or object, while a second strap is positioned across or near the rear of the vehicle or other object. Accordingly, movement of the vehicle or other object being supported by the system or assembly can be prevented or reduced when the system or assembly is being manipulated (e.g., moved relative to the ground, raised or lowered, tilted, etc.), thereby improving safety, enhancing function and providing one or more additional benefits and advantages to the assembly.

According to some embodiments, the connecting members comprise straps (e.g., adjustable nylon straps) that are 3-inch wide. Straps of different width may be used, such as, for example, straps that are 1 to 3 inches wide (1, 1.5, 2, 2.5, 3 inches, 1-2, 2-3 inches, values between the foregoing, etc.), smaller than 1 inch, or larger than 3 inches (e.g., 3-4, 4-5, 5-6 inches, greater than 6 inches, etc.), as desired or required. In other arrangements, however, the connecting members can include one or more other materials, either in addition to or in lieu of nylon. Further, the width, other dimensions, shape and/or other configuration of the connecting members can vary, as desired or required. In some embodiments, the connecting members (e.g., nylon or other thermoplastic straps) can comprise buckles (e.g., integrated buckles or similar devices or features) or other tightening members or features that facilitate quick and easy tightening, loosening and adjustment of the connecting members. In some embodiments, the connecting members satisfy the minimum required, expected and/or desired strength requirements that exceed any foreseeable usage requirements.

In some embodiments, once the system or assembly 10 is fully assembled and ready for use, all base units 20 (e.g., all four base units 20 for systems that include four base units) are coupled to form a generally unitary system. Additional or fewer connecting members can be used, however, in other arrangements. For example, in some configurations, the system need not have and does not include any side members or rails 50. In other embodiments, one or more additional structural or other connecting members are included in the system or assembly 10. For instance, although not shown in the accompanying figures, the system or assembly can comprise additional struts, interconnecting members and/or the like. Such additional members can secure one or more components of the system to each other to provide additional support, rigidity, strength and/or other benefits and advantages. In one embodiment, for example, one or more additional struts or members connect the side member or rail 50 and the strut or cross-member 60 that are coupled to the same base unit one another. In other arrangements, one or more diagonal struts or members connect diagonally-oriented base units (e.g., one or more components of such base units) 20 to one another. In other configurations, a second side rail 50 can be secured to the base units 20, on both the left and right sides.

In any of the embodiments, disclosed herein, the struts or cross-members 60 are higher than the side members 50 at all times. This ensures free and unobstructed movement and operation of the struts 60 and thus the entire system.

In some embodiments, the system can comprise one or more handles to help grip, handle, move and/or otherwise manipulate the system during use. For example, such handles can be include along one or more of the base units, the brackets included thereon or any other portion of the system (e.g., non-weight bearing brackets), side rails, struts and/or the like. Such handles (not shown) can be permanently or removably secured to the corresponding portion or component of the system.

In any of the embodiments of the system or assembly 10 disclosed herein, the vertical position of the vehicle or other object being supported can be varied from 20 to 60 inches relative to the ground surface (e.g., 28-46, 32-40, 20-24, 24-28, 28-32, 32-36, 36-40, 40-44, 44-48, 48-52, 52-56, 56-60 inches, values between the foregoing, etc.). In some embodiments, the vehicle can be raised to more than 60 inches or less than 20 inches from the ground, as desired or required.

According to some embodiments, the movement of each jack or other adjustment member 26 can be controlled either locally (e.g., at or near each jack or adjustment member 26, at or near the corresponding base unit, along or near a controller that is positioned at a side member or rail 50 and/or strut or cross-member 60, etc.) or remotely (e.g., using a remote controller, another type of separated or integrated controller, a smartphone or tablet device (e.g., via an application or program), a computing device (e.g., a personal computer, laptop, etc.) and/or the like.

Figure 7:
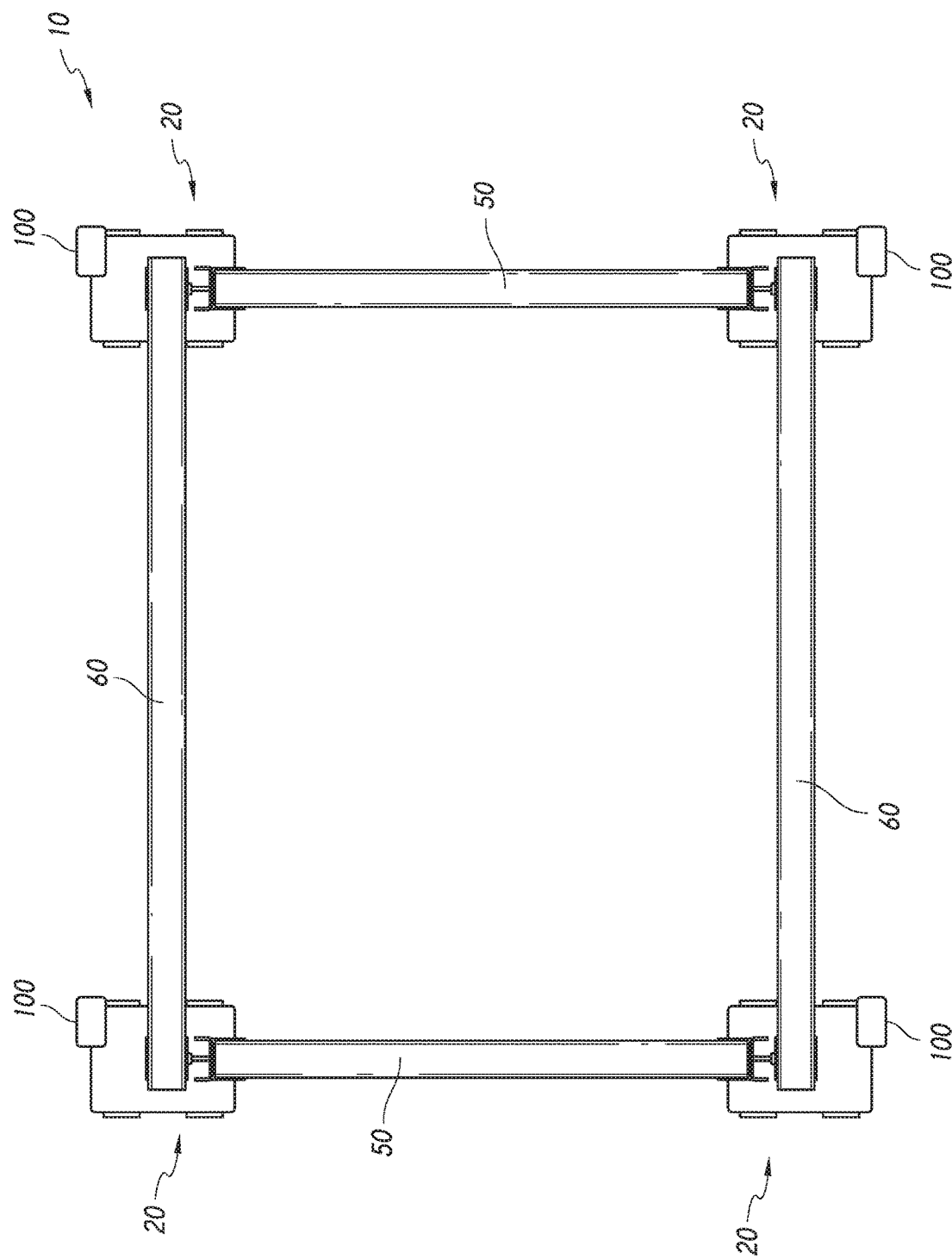
FIG. 7 illustrates a vehicle restoration system with certain control components according to one embodiment.

FIG. 7 schematically illustrates a top view of a system or assembly 10 comprising four base units 20 coupled to one another to form a generally unitary structure using side members 50 and struts 60, in accordance with the above discussion. As shown, each base unit 20 can comprise an individual controller 100 that is configured to permit a user to regulate the operation of the jack or other adjustment member 26 located at that base unit 20. In the illustrated embodiment, each base unit 20 comprises an individual controller 100; however, in other embodiments, one or more of the base units 20 does not include its own controller. In other words, in certain arrangements, a controller positioned at or near base unit 20 can be configured to control and operate the jacks or adjustment members 26 located at two or more base units 20, as desired or required, individually or in unison (e.g., together).

With continued reference to the schematic of FIG. 7, the controllers 100 are positioned along corners or edges of the corresponding base units 20. The depicted embodiment is merely provided a schematic, and it should not be interpreted that the controllers 100 are limited to the positioned shown therein. For example, in one simple embodiment, the controllers 100 are simply levers, buttons or other controllers located at each jack or adjustment member 26 (e.g., as are found in off-the-shelf jacks). Thus, in some embodiments, the controllers 100 are located on, along or near the jacks or adjustment members 26. In other embodiments, the controller 100 can be located along any portion of the base unit 20, such as, for example, a separate box or other enclosure along the base plate 22, mounted on the raised support member 30 (e.g., the bracket) and/or any other location, as desired or required.

In some embodiments, the controller 100 comprises a simple button, level, switch, dial, other hand-operated member and/or the like. In other embodiments, the controller comprises a display, a keypad or keyboard, a touchscreen display, etc. Thus, with embodiments that provide a screen or other visual display (e.g., a touchscreen, a LCD screen, etc.), the system can be configured to provide information to the user regarding the status of one or more of the jacks or other adjustment members 26, such as, for example, the exact vertical position, the pressure or force carried, stress, strain and/or moment, time elapsed, make and model of the vehicle, contact information of the vehicle or other object being supported by the system and/or the like. In addition, such a display can provide alarms or other warnings to the user, such as, for example and without limitation, force or strain warnings, timers, etc.

In order to provide the necessary information to a controller, display and/or any other device, the system or assembly 10 can include one or more sensors, timers and/or the like. For example, each jack or adjustment member 26 can include a force sensor (e.g., transducer), a strain sensor, a moment sensor, a location sensor, etc. Thus, in some embodiments, one or more sensors can be coupled to the controllers 100 and/or any other device (e.g., CPU, other computing or processing device (either internal or external to the system), etc.).

Further, in some embodiments, each jack or other adjustment member 26 can include a cable or other electronic attachment member that allows it to be coupled (e.g., via wireless or wired connection) to another device. For example, the cable can connect various (e.g., some or all) jacks or individual controllers 100 located at each base unit 20 to each other, to a separate controller, CPU, main controller or other processing device and/or the like. Thus, a single (or at least less than four individual controllers 100) can be used in a single system or assembly having four base units 20.

FIG. 8 schematically illustrates one embodiment of a system 10 comprising a main controller 200 that is configured to operatively couple to each jack or adjustment member 26 (and/or the controller of each jack or adjustment member 26, e.g., the controllers 100 depicted in FIG. 7). As shown in FIG. 8, the controller can be further operatively coupled to a separate controller 210, such as a remote controller. The various operative connections described and illustrated herein, e.g., the connections to/from the main controller in FIG. 8, the possible connections between different jacks/individual controllers 100 described above, etc.) can be wired connections (e.g., using one or more cables, wires, buses, etc.) and/or wireless (e.g., Bluetooth, Wi-Fi, other wireless protocols that exist at the time this application or future protocols, etc.).

In some embodiments, regardless of the exact configuration of the system or assembly 10, the user can control the movement of one or more of the jack or adjustment members 26 (e.g., individually or collectively) using a separate controller 210. Such a controller can be remote, removable or separable from the rest of the system (e.g., a remote controller). The controller 210 can be provided with the system 10; alternatively, a separate device, such as a smart phone, a tablet, a laptop or other personal computing device, etc. can be used to control the system. Thus, one or more applications, programs or other interface systems can be developed and used for such separate devices.

In some embodiments, the jacks or adjustment members 26 are configured to be raised or lowered individually or collectively according to a predetermined or customized protocol. Thus, the system can be configured to have preset or customizable protocols for raising, lowering, tilting, otherwise moving, etc. the jacks 26 during a restoration or other procedure. Accordingly, such preset protocols can be available to the user via an interface (e.g., touchscreen or other input device of the system, a separate smartphone, tablet or other computing device, etc.) to facilitate conducting a particular set of movements or operations.

In any of the embodiments disclosed herein, the base units 20 can be configured to be moved using some non-manual manner (e.g., electrically, pneumatically, etc.) to facilitate movement of the system 10 relative to a ground surface. Any of the controllers described herein with reference to operation of the jacks can also be used to regulate the movement of wheels or other devices that would help selectively translate or otherwise move the base units relative to the ground. However, in other embodiments, the system can comprise separate control mechanism to operate movement of the jacks and movement of the base units relative to the ground, as desired or required.

A complete auto restoration typically involves car disassembly, body work, paint, repairs (e.g., mechanical repairs, electrical repairs, etc.) reassembly and/or other steps. Under certain circumstances, a total restoration can take an experienced mechanic or other restoration expert hundreds of hours (e.g., over 500, 750, 1000 hours, or more). The amount and type of work associated with such restorations can vary depending on the condition of the car when the restoration is initiated, the desired final intended restoration product, the quality and workmanship of the restoration, budget, the level of experience, skill and familiarity and the like. Further, in some arrangements, a significant restoration can require a very large footprint (e.g., the footprint otherwise occupied by several cars) with respect to working space. Thus, as discussed in greater detail herein, the various embodiments disclosed in the present application can facilitate a restoration procedure by reducing the completion time, reducing the number of restorers required, reducing the required footprint to conduct the work, improving safety, facilitating the various steps and/or the like. In some embodiments, one or more of the following steps or procedures can be facilitated by the embodiments disclosed herein: body disassembly, disassembly of other components (e.g., frame, suspension, steering, brakes, drivetrain, accessories, etc.), painting and associated preparation of various components, clean up, assembly and/or the like. The foregoing steps are not intended to be exhaustive.

The systems, apparatuses, devices and/or other articles disclosed herein may be formed through any suitable means. The various methods and techniques described above provide a number of ways to carry out the inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught, referenced and/or suggested herein.

Although several embodiments and examples are disclosed herein, the present application extends beyond the specifically disclosed embodiments to other alternative embodiments and/or uses of the inventions and modifications and equivalents thereof. It is also contemplated that various combinations or subcombinations of the specific features and aspects of the embodiments may be made and still fall within the scope of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

While the embodiments disclosed herein are susceptible to various modifications, and alternative forms, specific examples thereof have been shown in the drawings and are herein described in detail. It should be understood, however, that the inventions are not to be limited to the particular forms or methods disclosed, but, to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "providing" include "instructing providing." The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers. For example, "about 10 mm" includes "10 mm." Terms or phrases preceded by a term such as "substantially" include the recited term or phrase. For example, "substantially parallel" includes "parallel."

What is claimed is:

1. A vehicle restoration system, comprising:
a first base unit, a second base unit, a third base unit, and at least a fourth base unit;
an adjustment member positioned at each base unit, the adjustment member being configured to support a surface of a vehicle along an upper end of the adjustment member, the jack being configured to selectively change a vertical position of the upper end of the adjustment member;
a first side member coupling the first base unit to the second base unit;
a second side member coupling the third base unit to the fourth base unit;
a first strut coupling the first base unit to the third base unit; and
a second strut coupling the second base unit to the fourth base unit;
wherein, when the system is assembled, the system forms a rectangular shape, such that the first and second side members are parallel to each other, and the first and second struts are parallel to each other;
wherein the first and second side members provide stability to the system;
wherein the first and second struts are configured to support and selectively raise and lower at least a portion of a vehicle; and
wherein each of the first and second struts are positioned above each of the first and second side members.

2. The system of claim 1, wherein the adjustment members comprise hydraulic jacks.

3. The system of claim 1, wherein the first and second side members comprise aluminum.

4. The system of claim 1, wherein the first and second side members comprise hollow tubes.

5. The system of claim 1, wherein the first and second side members are adjustable in length.

6. The system of claim 1, wherein the first and second struts comprise aluminum.

7. The system of claim 1, wherein the first and second struts comprise hollow tubes.

8. The system of claim 1, wherein the first and second struts are adjustable in length.

9. The system of claim 1, wherein the first and second struts comprise one or more anti-skid coatings, layers, members or features.

10. The system of claim 9, wherein the one or more anti-skid coatings, layers, members or features comprise a rubber or tactile features.

11. The system of claim 1, wherein each of the base units comprises casters or other wheels to facilitate movement of the system relative to a ground surface.

12. The system of claim 1, wherein the adjustment members are configured to be moved collectively at the same time.

13. The system of claim 1, wherein the adjustment members are configured to be moved individually.

14. The system of claim 1, further comprising a controller associated with each adjustment member, the controller being configured to adjust the vertical location of the upper end of the adjustment member.

15. The system of claim 1, further comprising a central controller that is configured to adjust the vertical location of the upper end of each of the adjustment members.

16. The system of claim 15, wherein the central controller is configured to operatively couple to a remote controller.

17. The system of claim 16, wherein the remote controller is part of the system.

18. The system of claim 16, wherein the remote controller is separate of the system.

19. The system of claim 18, wherein the remote controller comprises a smartphone, a tablet, a laptop or another computing or control device.

* * * * *